United States Patent
Matsuda et al.

(10) Patent No.: US 8,589,545 B2
(45) Date of Patent: Nov. 19, 2013

(54) JOB EXECUTION SYSTEM, JOB EXECUTION APPARATUS, COUNTER DATA ADMINISTRATION METHOD THEREOF AND RECORDING MEDIUM

(75) Inventors: Hideyuki Matsuda, Suita (JP); Kazumi Sawayanagi, Itami (JP); Toshihiko Otake, Ikeda (JP); Okihisa Yoshida, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 12/358,068

(22) Filed: Jan. 22, 2009

(65) Prior Publication Data
US 2009/0307342 A1 Dec. 10, 2009

(30) Foreign Application Priority Data
Jun. 5, 2008 (JP) .................................. 2008-148660

(51) Int. Cl.
*G06F 15/173* (2006.01)
(52) U.S. Cl.
USPC ........................................ 709/225; 358/1.14
(58) Field of Classification Search
USPC ........................................ 709/225; 358/1.14
See application file for complete search history.

(56) References Cited

U.S. PATENT DOCUMENTS

| | | | | |
|---|---|---|---|---|
| 6,353,436 B1 * | 3/2002 | Reichlen | ....................... | 345/427 |
| 6,785,727 B1 * | 8/2004 | Yamazaki | ....................... | 709/229 |
| 7,738,124 B2 * | 6/2010 | Ogura et al. | ....................... | 358/1.14 |
| 7,953,819 B2 * | 5/2011 | Liang et al. | ....................... | 709/219 |
| 2004/0021892 A1 * | 2/2004 | Ueda | ....................... | 358/1.14 |
| 2005/0275868 A1 * | 12/2005 | Higashiura et al. | ....................... | 358/1.14 |
| 2006/0017960 A1 * | 1/2006 | Kakigi | ....................... | 358/1.14 |
| 2007/0253015 A1 * | 11/2007 | Eguchi et al. | ....................... | 358/1.14 |
| 2008/0068642 A1 * | 3/2008 | Takahashi | ....................... | 358/1.15 |
| 2008/0225325 A1 * | 9/2008 | Chen et al. | ....................... | 358/1.14 |

FOREIGN PATENT DOCUMENTS

JP   2005-24817   *   1/2005

* cited by examiner

*Primary Examiner* — David Lazaro
*Assistant Examiner* — Marie Georges Henry
(74) *Attorney, Agent, or Firm* — Morrison & Foerster LLP

(57) ABSTRACT

A job execution system comprises a job execution apparatus and a server apparatus interconnected via a network. The server apparatus stores in itself, counter data defining the range of using the job execution apparatus, which is allowed for a user who logs in the job execution apparatus by authentication. The job execution apparatus obtains entirely or partially the counter data of the login user from the server apparatus; returns the counter data that is reduced by job execution to the server apparatus when the user logs out thereof; judges according to conditions set on the job execution apparatus itself, whether or not the counter data returning operation should be suspended; and suspends the counter data returning operation if judges that it should be suspended.

23 Claims, 10 Drawing Sheets

JOB EXECUTION SYSTEM, JOB EXECUTION APPARATUS, COUNTER DATA ADMINISTRATION METHOD THEREOF AND RECORDING MEDIUM

This application claims priority under 35 U.S.C. §119 to Japanese Patent Application No. 2008-148660 filed on Jun. 5, 2008, the entire disclosure of which is incorporated herein by reference in its entirety.

BACKGROUND OF THE INVENTION

1. Field of the Invention

The present invention relates to a job execution system in which a job execution apparatus such as an image forming apparatus, and a server apparatus are employed; the job execution apparatus preferably employed in this job execution system; a counter data administration method of the job execution apparatus; and a computer readable recording medium having a counter data administration program recorded therein to make a computer execute processing.

2. Description of the Related Art

The following description sets forth the inventor's knowledge of related art and problems therein and should not be construed as an admission of knowledge in the prior art.

According to Japanese Unexamined Laid-open Patent Publication No. 2005-024817, there is a system disclosed as a job execution apparatus in which a job execution apparatus such as an image forming apparatus, and a server apparatus are interconnected via a network, and wherein the server apparatus stores in itself counter data that defines the range of use of the job execution apparatus, allowed for each user, and when a user logs in the job execution apparatus, the job execution apparatus obtains counter data of this user from the server apparatus.

The counter data includes data related to the allowed number of sheets, function limitation information related to allowed functions, and etc. for example. The user who logs in the job execution apparatus is allowed to use the job execution apparatus within the use range indicated by the allowed number of sheets and the function limitation information. Each job execution is reflected to the counter data, and the allowed number of sheets and etc., included in the counter data, are reduced by each job execution.

With this conventional system, the counter data reduced by job execution is required to be returned to the server apparatus, when the user logs out of the job execution apparatus after use, or if the user is forcibly logged out thereof due to timeout or etc.

Thus, in a conventional manner, counter data is returned to the server apparatus from the job execution apparatus at each logout of a user, and the counter data is obtained again from the server apparatus if the same user logs in again soon after his/her last login.

As described above, with the conventional system, counter data is required to be returned to the server apparatus from the job execution apparatus at each user logout and obtained again from the server apparatus at each user login, back and forth. Therefore, if a user logs in the job execution apparatus again soon after his/her last login, he/she is required to be kept waiting to instruct job execution until his/her counter data is obtained again, which is still unresolved and inconvenient.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide a job execution system that is capable of eliminating the inconvenience that counter data is required to be obtained and returned back and forth, if a user logs in a job execution apparatus again soon after his/her last login.

It is another objective of the present invention to provide a job execution apparatus that is capable of eliminating the inconvenience that counter data is required to be obtained and returned back and forth, if a user logs in a job execution apparatus again soon after his/her last login.

It is yet another objective of the present invention to provide a counter data administration method of the job execution apparatus, which is capable of eliminating the inconvenience that counter data is required to be obtained and returned back and forth, if a user logs in a job execution apparatus again soon after his/her last login.

It is still yet another objective of the present invention to provide a computer readable recording medium having a program stored therein to make a computer of the job execution apparatus implement the counter data administration method.

According to a first aspect of the present invention, a job execution system comprises a job execution apparatus and a server apparatus that are interconnected via a network, wherein:

the server apparatus comprises:
  counter data storage that stores in itself counter data defining the range of using the job execution apparatus, which is allowed for a first user who logs in the job execution apparatus by authentication, and the job execution apparatus comprises:
  an obtaining portion that obtains entirely or partially from the server apparatus, counter data of the first user who logs in the job execution apparatus itself;
  a returning portion that returns to the server apparatus, the counter data that is reduced by job execution, when the first user logs out thereof;
  a judgment portion that judges according to conditions set on the job execution apparatus itself, whether or not the returning operation performed by the returning portion should be suspended; and
  a suspending portion that suspends the returning operation performed by the returning portion, if the judgment portion judges that the returning operation should be suspended.

According to a second aspect of the present invention, a job execution apparatus comprises:
  an obtaining portion that obtains entirely or partially from a server apparatus, counter data defining the range of using the job execution apparatus itself, which is allowed for a first user who logs in the job execution apparatus itself by authentication;
  a returning portion that returns to a server apparatus, the counter data that is reduced by job execution, when the first user logs out thereof;

a judgment portion that judges according to conditions set on the job execution apparatus itself, whether or not the returning operation performed by the returning portion should be suspended; and a suspending portion that suspends the returning operation performed by the returning portion, if the judgment portion judges that the returning operation should be suspended.

According to a third aspect of the present invention, a counter data administration method of the job execution apparatus comprises:

obtaining entirely or partially from a server apparatus, counter data defining the range of using a job execution apparatus, which is allowed for a user who logs in the job execution apparatus by authentication;

returning the counter data that is reduced by job execution, to the server apparatus when the user logs out thereof;

judging according to conditions set on the job execution apparatus, whether or not the returning operation should be suspended; and suspending the returning operation if it is judged that the returning operation should be suspended.

According to a fourth aspect of the present invention, a computer readable recording medium has a counter data administration program recorded therein to make a computer of the job execution apparatus execute:

obtaining entirely or partially from a server apparatus, counter data defining the range of using a job execution apparatus, which is allowed for a user who logs in the job execution apparatus by authentication;

returning the counter data that is reduced by job execution, to the server apparatus when the user logs out thereof;

judging according to conditions set on the job execution apparatus, whether or not the returning operation should be suspended; and suspending the returning operation if it is judged that the returning operation should be suspended.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
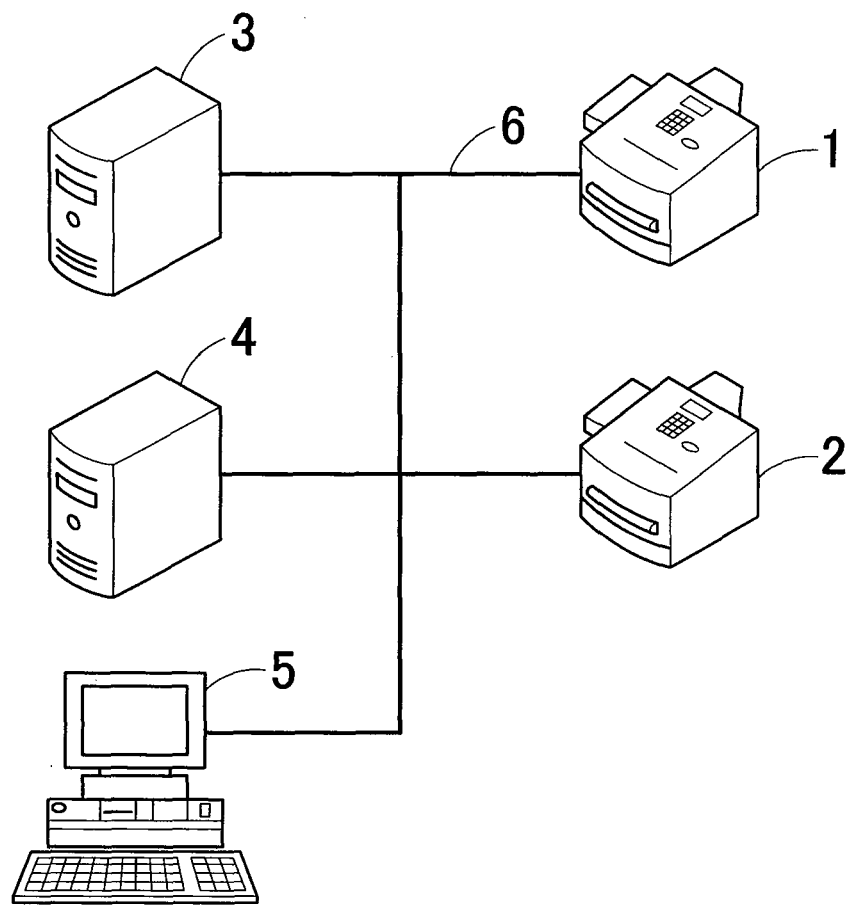
FIG. 1 is a view schematically showing a configuration of a job execution system according to one embodiment of the present invention.

FIG. 1 is a view schematically showing a configuration of a job execution system according to one embodiment of the present invention.

In this job execution system, image forming apparatuses 1 and 2 as job execution apparatuses according to one embodiment of the present invention, an authentication server apparatus (hereinafter, "server apparatus" will be also referred to simply as "server") 3, an accounting administration server 4, a user terminal 5 and etc. are employed. And these image forming apparatuses 1 and 2, the accounting administration server 3, the authentication server 4 and the user terminal 5 are interconnected via a network 6.

In this embodiment, a MFP (Multi Function Peripheral) that is a multifunctional digital machine having the copy function, the print function, the facsimile function and other functions is employed as the image forming apparatus 1. And by utilizing these functions, users can execute various jobs such as copy jobs, print jobs, facsimile jobs and scan jobs. A MFP is also employed as the image forming apparatus 2.

Figure 2:
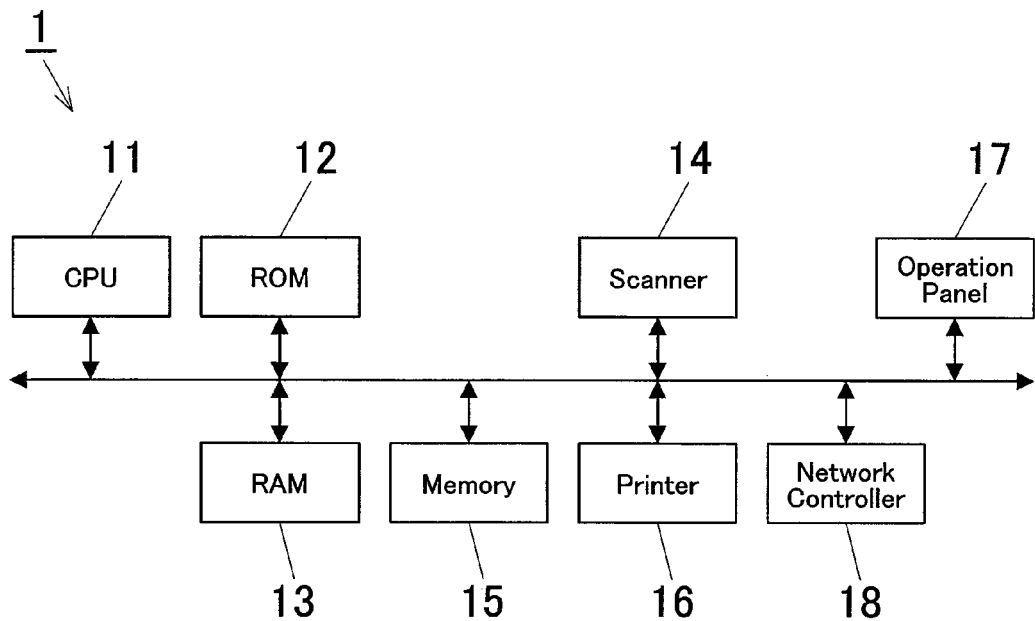
FIG. 2 is a block diagram schematically showing a configuration of an image forming apparatus.

FIG. 2 is a block diagram schematically showing a configuration of the image forming apparatus 1. Since a configuration of the image forming apparatus 2 is exactly the same as that of the image forming apparatus 1, explanation thereof is omitted.

The image forming apparatus 1 comprises a CPU 11, a ROM 12, a RAM 13, a scanner 14, a memory 15, a printer 16, an operation panel 17, a network controller (NIC) 18 and etc.

The CPU 11 centrally controls the entire image forming apparatus 1. Specifically in this embodiment, as well as regular operations to execute the copy function, the print function and the facsimile function, the CPU 11 controls the following operations.

Concretely, under the control of the CPU 11, authentication information entered by user for login is transmitted to the authentication server 3, and according to an authentication result received from the authentication server 3, it is judged whether or not to permit his/her login. And counter data to be described later is obtained from the accounting administration server 4, and the user is permitted to use the image forming apparatus 1 within the use range indicated by the counter data. Further, the counter data such as the allowed number of sheets is reduced at each job execution instructed by a user, and the reduced counter data is returned to the accounting administration server 4 when the user logs out.

Still further, under the control of the CPU 11, it is judged whether or not the counter data returning operation should be suspended when the user logs out, according to conditions set on the job execution apparatus itself. And if it is judged that the counter data returning operation should be suspended, the counter data returning operation is suspended. Further, the counter data that is kept on hold is returned after a lapse of a predetermined period of time or at a predetermined time.

The ROM 12 is a memory that stores in itself an operation program for the CPU 11 and other data. The RAM 13 is a memory that provides an operation area for the CPU 11 to execute the operation program.

The scanner 14 reads an image on a document placed on a document table (not shown in Figure) and converts it into image data.

The memory 15 is a hard disk drive (HDD) or etc. for example. And it records in itself, various data such as counter data obtained from the accounting administration server 4, image data read out by the scanner 14, image data received from external apparatuses, and operation logs (log information) of the image forming apparatus 1. Also, the memory 15 has one or more than one memory areas (Boxes). Some of the Boxes are personal Boxes given to respective users and allowed to be accessed by their respective owner users only, and some of the Boxes are public Boxes allowed to be accessed by anyone without limitation.

The printer 16 prints out image data read out from a document by the scanner 14, print data received from the user terminal 2, document data stored in the Boxes, and other data, according to predetermined output conditions.

The operation panel 17 is used to perform various entry operations and display thereon screens, messages and etc. And it comprises a key entry portion including numeric keys, a start key and other keys, and a display such as a liquid crystal display.

The network controller 18 controls communication with external apparatuses such as the image forming apparatus 2, the authentication server 3, the accounting administration server 4 that are interconnected thereto via the network 5.

The authentication server 3 authenticates users who log in the image forming apparatus 1, and it is a personal computer. In this embodiment, user authentication means person authentication, and section authentication to check if users belong to a predetermined section. The authentication server 3 stores in itself authentication information for user authentication. The authentication server 3 performs authentication by comparing authentication information such as a user ID and a password entered by a user from the image forming apparatus 1 then received from the image forming apparatus 1, and the authentication information stored in the authentication server 3 itself, and then, transmits an authentication result to the image forming apparatus 1.

The accounting administration server 4 stores and administers counter data set for respective users as described above, and is a personal computer. The counter data includes accounting data related to the allowed number of sheets and function limitation information related to allowed functions, for example. And users are allowed to use the image forming apparatus 1 within their respective use ranges that are the allowed number of sheets indicated by the accounting data and the allowed functions indicated by the function limitation information.

The user terminal 5 is a personal computer, and is capable of transmitting to the image forming apparatus 1 via the network 6, print jobs for printing by the image forming apparatus 1, documents and etc. created by users, store jobs for storing them in Boxes of the memory 15, and other jobs.

Figure 3:
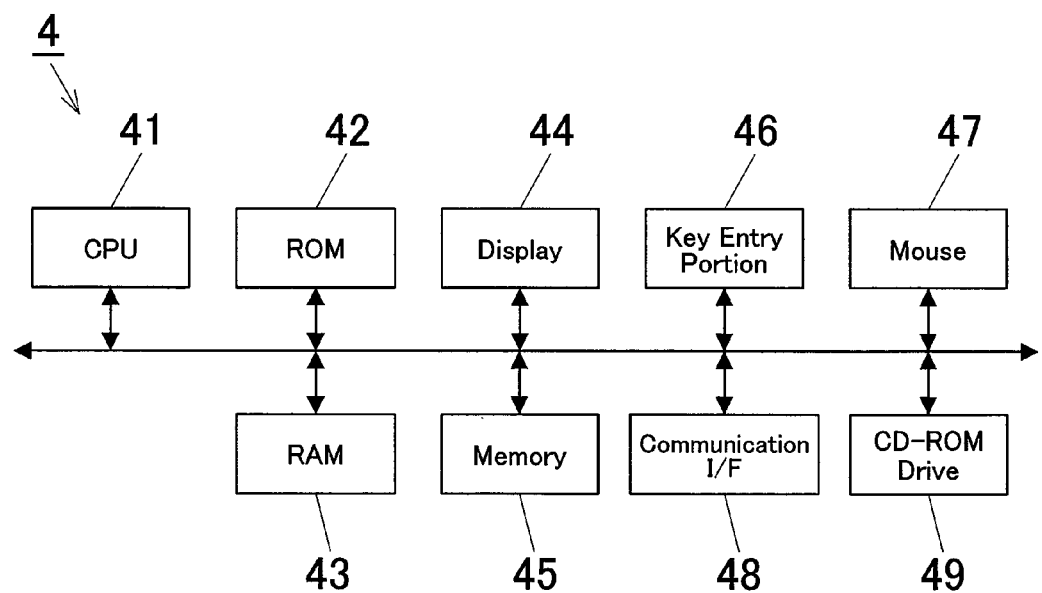
FIG. 3 is a block diagram schematically showing a configuration of an accounting administration server.

FIG. 3 is a block diagram schematically showing a configuration of the accounting administration server 4. Since a hardware configuration of the authentication server 3 and the user terminal 5 is exactly the same as that of the accounting administration server 4, explanation thereof is omitted.

The accounting administration server 4 comprises a CPU 41, a ROM 42, a RAM 43, a display 44, a memory 45, a key entry portion 46, a mouse 47, a communication interface (communication I/F) 48, a CD-ROM drive 49 and etc., and these are interconnected via a system bus 50.

The CPU 41 centrally controls the entire accounting administration server 4 by executing a program stored in the ROM 42. In this embodiment, it controls operations such that counter data of a user is transmitted to the image forming apparatus 1 and 2, in response to a request for the counter data, which is received from the image forming apparatus 1 and 2.

The ROM 42 is a recording medium that stores in itself, a program executed by the CPU 41 and other data.

The RAM 43 is a recording medium that provides an operation area for the CPU 41 to execute an operation program.

The display 44 is a liquid crystal display, a CRT or etc., and displays on itself various messages, entry accepting screens and selection screens for users, and etc.

The memory 15 is a recording medium such as a hard disk, and it stores in itself counter data of respective users, various application programs and other data.

The key entry portion 46 and the mouse 47 are used by users to perform entry operations.

The communication interface (communication I/F) 48 functions as a communicator that exchanges data with external apparatuses such as the image forming apparatuses 1 and 2, via the network 6.

The CD-ROM drive 19 drives CD-ROMs.

Figure 4:
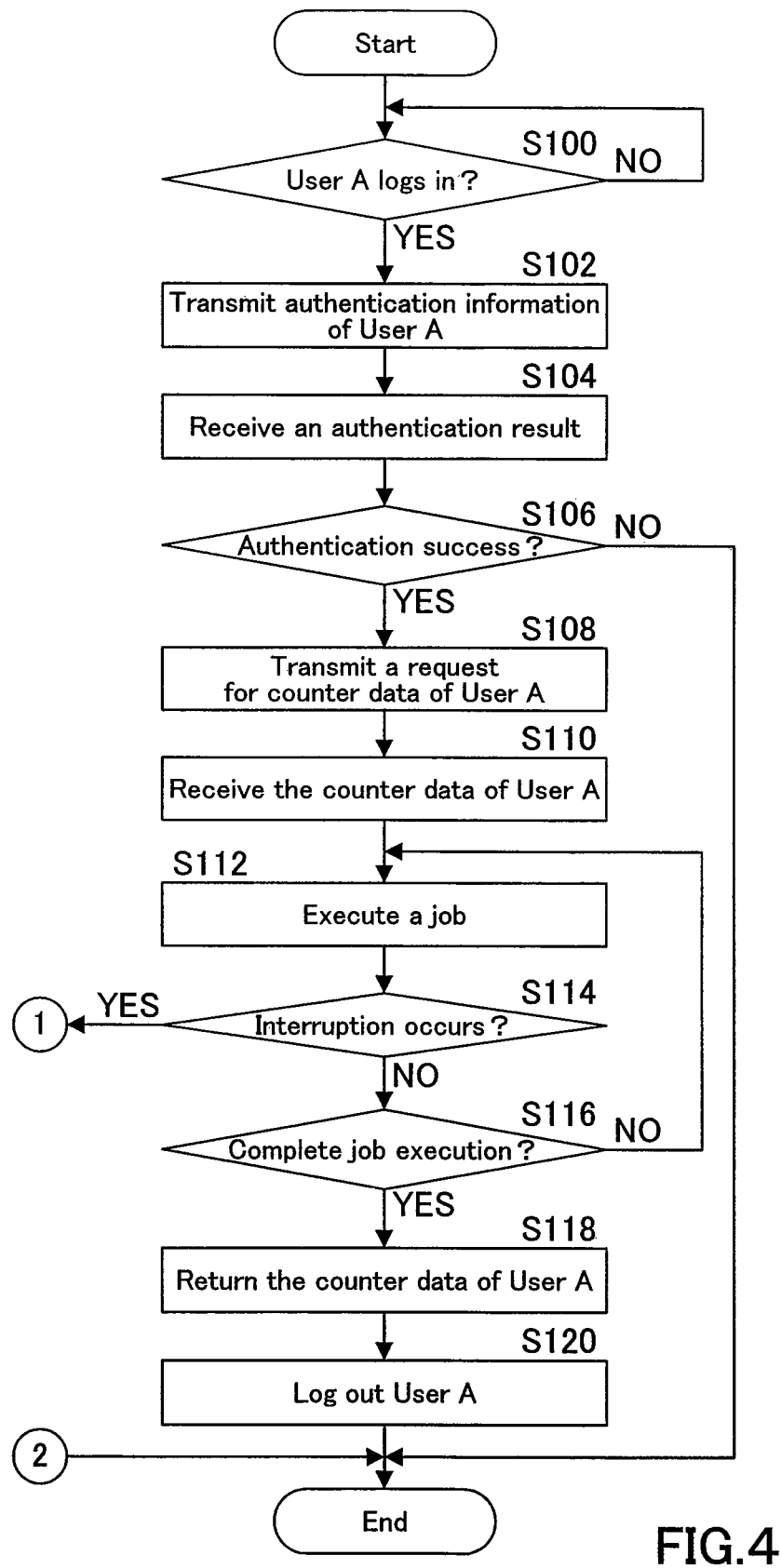
FIG. 4 is a flowchart representing an example of a procedure executed in an image forming apparatus that is employed in the job execution system shown in FIG. 1.

FIG. 4 is a flowchart representing an example of a procedure executed in the image forming apparatus 1 of the job execution system shown in FIG. 1.

In this example, if User B interrupts job execution after User A logs in the image forming apparatus 1, counter data of User A that is obtained already, is kept on hold instead of being returned. The procedure shown in FIG. 4 is executed by the CPU 11 of the image forming apparatus 1 according to an operation program stored in a recording medium such as the ROM 12.

In Step S100, it is judged whether or not a user logs in the image forming apparatus 1. If User A logs in the image forming apparatus 1 by entering his/her authentication information via the operation panel 17 thereof, the image forming apparatus 1 transmits an authentication request including the entered authentication information to the authentication server 3, in Step S102. The authentication server 3 performs authentication and transmits an authentication result to the image forming apparatus 1. Subsequently, the image forming apparatus 1 receives the authentication result in Step S104, and it is judged in Step S106, whether or not it is an authentication success. If it is an authentication failure (NO in Step S106), the routine terminates.

If it is an authentication success (YES in Step S106), a request for counter data of User A is transmitted to the accounting administration server 4 in Step S108. In response to the request, the accounting administration server 4 transmits the counter data of User A. Here, the counter data may be entirely or partially transmitted to the image forming apparatus 1. For example, if the allowed number of sheets for printing is set to "1000", only "100" thereof may be transmitted as counter data, and thus this user is allowed to print 100 sheets. If he/she hopes to print more than 100 sheets, it is only necessary to obtain counter data again.

Subsequently in Step S110, the image forming apparatus 1 receives the counter data of User A. And a menu listing the allowed functions is displayed on the operation panel 17, and thus User A can instruct to execute a job within the use range indicated thereby. And the job specified by User A is executed in Step S112.

Then in Step S114, it is judged whether or not job execution of the image forming apparatus 1 is interrupted by another user. If it is not interrupted (NO in Step S114), then it is judged in Step S116, whether or not job execution is completed, in other words, User A performs an operation to log out. If job execution is not completed yet (NO in Step S116), the routine goes back to Step S112 and continues job execution. If job execution is completed (YES in Step S116), the counter data of the User A, which is reduced by User A's job execution, is returned to the accounting administration server 4 in Step S118, and User A is logged out of the accounting administration server 4 in Step S120. Then the routine terminates.

Figure 5:
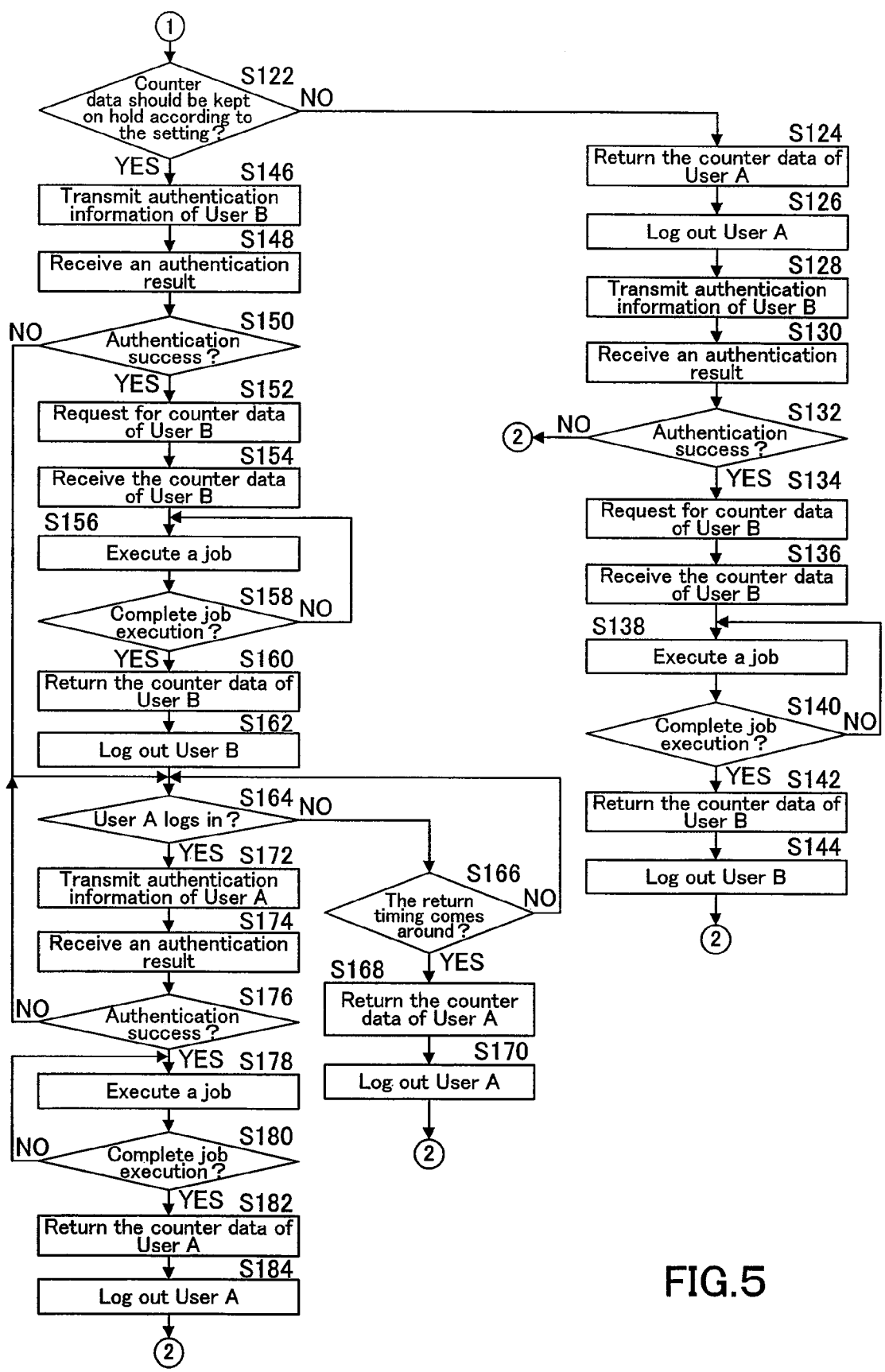
FIG. 5 is a flowchart continued from FIG. 4.

In Step S114, if job execution is interrupted by another user (for example, User B) (YES in Step S114), the routine proceeds to Step S122 of FIG. 5, in which it is judged according to the setting, whether or not counter data should be kept on hold in the case of "interruption". The setting whether or not to keep counter data on hold if job execution is interrupted by another user, is initially configured, and the initially configured setting may be unchangeable or may be changed later on by an administrator or etc.

If counter data does not have to be kept on hold according to the setting (NO in Step S122), the counter data of User A is returned to the accounting administration server 4 in Step S124, and User A is logged out of the accounting administration server 4 in Step S126.

On the other hand, in a conventionally manner, if job execution is interrupted by User B, the counter data of User A is returned to the accounting administration server 4 and User A is logged out of the accounting administration server 4, unexceptionally, without making a judgment according to the setting, whether or not counter data should be kept on hold in the case of "interruption".

After User A is logged out, a login process and a job execution process are performed for User B who interrupted job execution, as in the case of User A. To explain concretely, if User B logs in the image forming apparatus 1 by entering his/her authentication information via the operation panel 17 thereof, the image forming apparatus 1 transmits an authentication request including the entered authentication information to the authentication server 3, in Step S128. The authentication server 3 performs authentication and transmits an authentication result to the image forming apparatus 1. Subsequently, the image forming apparatus 1 receives the authentication result in Step S130, and it is judged in Step S132, whether or not it is an authentication success. If it is an authentication failure (NO in Step S132), the routine terminates.

If it is an authentication success (YES in Step S132), a request for counter data of User B is transmitted to the accounting administration server 4 in Step S134. Then, the image forming apparatus 1 receives the counter data of User B in Step S136, and a job is executed according to User B's instruction in Step S138. Then, it is judged in Step S140 whether or not job execution is completed. If job execution is not completed yet (NO in Step S140), the routine goes back to Step S138 and continues job execution. If job execution is completed (YES in Step S140), the counter data of User B, which is reduced by job execution, is returned to the accounting administration server 4 in Step S142, and User B is logged out of the accounting administration server 4 in Step S144. Then the routine terminates.

In Step S122, if counter data should be kept on hold according to the setting (YES in Step S122), authentication information of User B who interrupted job execution is transmitted to the authentication server 3 in Step S146. In this case, the counter data of User A is kept on hold instead of being returned.

The authentication server 3 performs authentication of User B and transmits an authentication result to the image forming apparatus 1.

Subsequently, the image forming apparatus 1 receives the authentication result in Step S148, and it is judged in Step S150, whether or not the authentication result is an authentication success. If it is an authentication failure (NO in Step S150), the routine proceeds to Step S164.

If it is an authentication success (YES in Step S150), a request for counter data of User B is transmitted to the accounting administration server 4 in Step S152. Then, the image forming apparatus 1 receives the counter data of User B in Step S154, and a job is executed according to User B's instruction in Step S156. Then, it is judged in Step S158, whether or not job execution is completed. If job execution is not completed yet (NO in Step S158), the routine goes back to Step S156 and continues job execution. If job execution is completed (YES in Step S158), the counter data of User B, which is reduced by job execution, is returned to the accounting administration server 4 in Step S160, and User B is logged out of the accounting administration server 4 in Step S162. Then the routine proceeds to Step S164.

In Step S164, it is judged whether or not User A, whose job execution is interrupted by User B, logs in. If User A does not log in (NO in Step S164), then it is judged in Step S166, whether or not the timing for returning counter data comes around. In this embodiment, the return timing is set to the time when a predetermined period of time has elapsed from logout of User B (the time when timeout occurs).

If the return timing does not come around yet (NO in Step S166), the routine goes back to Step S164 and waits until User A logs in. If the return timing comes around (YES in Step S166), the counter data of User A, which is kept on hold, is returned in Step S168, and User A is logged out of the accounting administration server 4 in Step S170.

Meanwhile in Step S164, if User A logs in (YES in Step S164), authentication information of User A is transmitted to the authentication server 3 in Step S172. Then in Step S176, an authentication result is received, and it is judged in Step S176, whether or not it is an authentication success. If it is an authentication failure (NO in Step S176), the routine goes back to Step S164 and waits until User A logs in again.

If it is an authentication success (YES in Step S176), a job is executed according to User A's instruction in Step S178. And it is judged in Step S180, whether or not job execution is completed. If job execution is not completed yet (NO in Step S180), the routine goes back to Step S178 and continues job execution. If job execution is completed (YES in Step S180), the counter data of User A is returned to the accounting administration server 4 in Step S182, and User A is logged out of the accounting administration server 4 in Step S284.

As described above in this embodiment, if User B interrupts job execution and uses the image forming apparatus 1 while User A is in login status, an operation to return counter data of User A is suspended, since even if the counter data of User A is returned, it would be obtained back anyway as soon as User A logs in again. Thus, it is not necessary any more to return and obtain back and forth the counter data of User A, and User A can execute a job soon after logging in again without waiting until his/her counter data is obtained back.

Furthermore, in this embodiment, if User A does not log in again after logout of User B who interrupted job execution and the return timing comes around i.e. timeout occurs, the counter data of User A is forcibly returned to the accounting administration server 4, which could eliminate the inconvenience that the counter data of User A remains kept in the image forming apparatus 1 for a long time.

As described in the embodiment shown in FIG. 4 and FIG. 5, if a user interrupts job execution while User A is in login status, an operation to return the counter data is suspended. However, an administrator or etc. may preliminarily set on the image forming apparatus 1, conditions for suspending the counter data returning operation.

Figure 6:
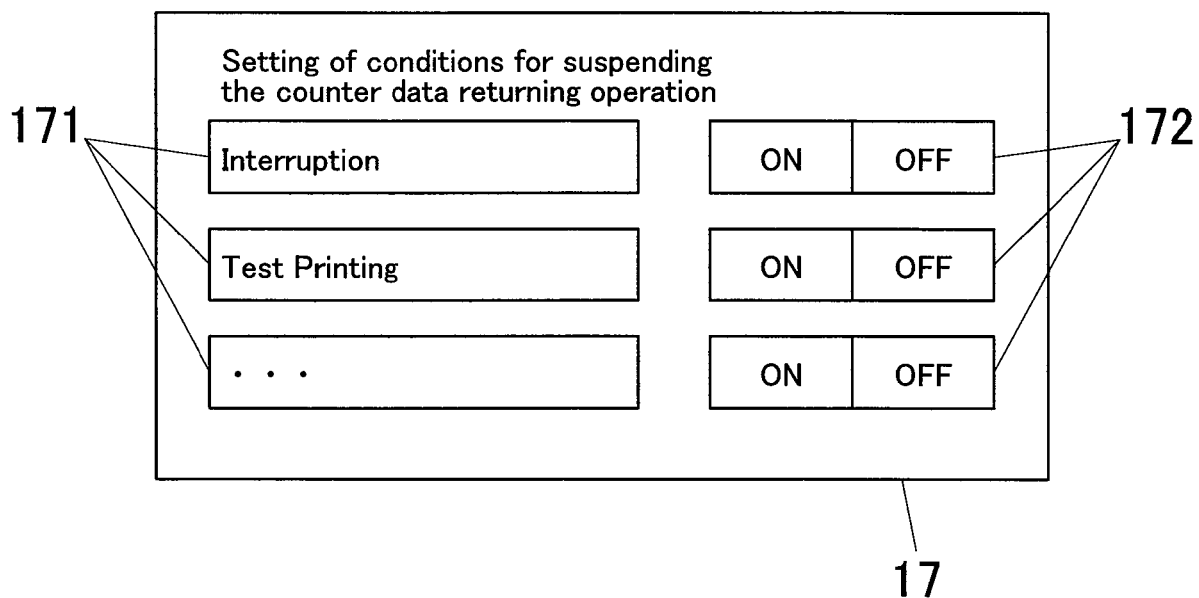
FIG. 6 shows a setting screen to set conditions for suspending the counter data returning operation, which is displayed on an operation panel of the image forming apparatus.

FIG. 6 shows a setting screen to set conditions as mentioned right above, which is displayed on the operation panel 17 of the image forming apparatus 1.

In the screen shown in FIG. 6, entry fields 171 to enter "conditions for suspending the counter data returning operation" and selection buttons 172 to set "ON" or "OFF" for the respective entry fields, are displayed. An administrator or etc. presses the "ON" selection button 172 after entering a condition for suspension in the entry field 171, and thereby the setting is enabled. According to the settings in this example of FIG. 6, if interruption happens and the test print mode (to be described later) is "ON", the counter data returning operation will be suspended.

Instead of the operation panel 17, conditions may be set from an administrator's terminal or etc. that is a personal computer, by using a setting application.

Figure 7:
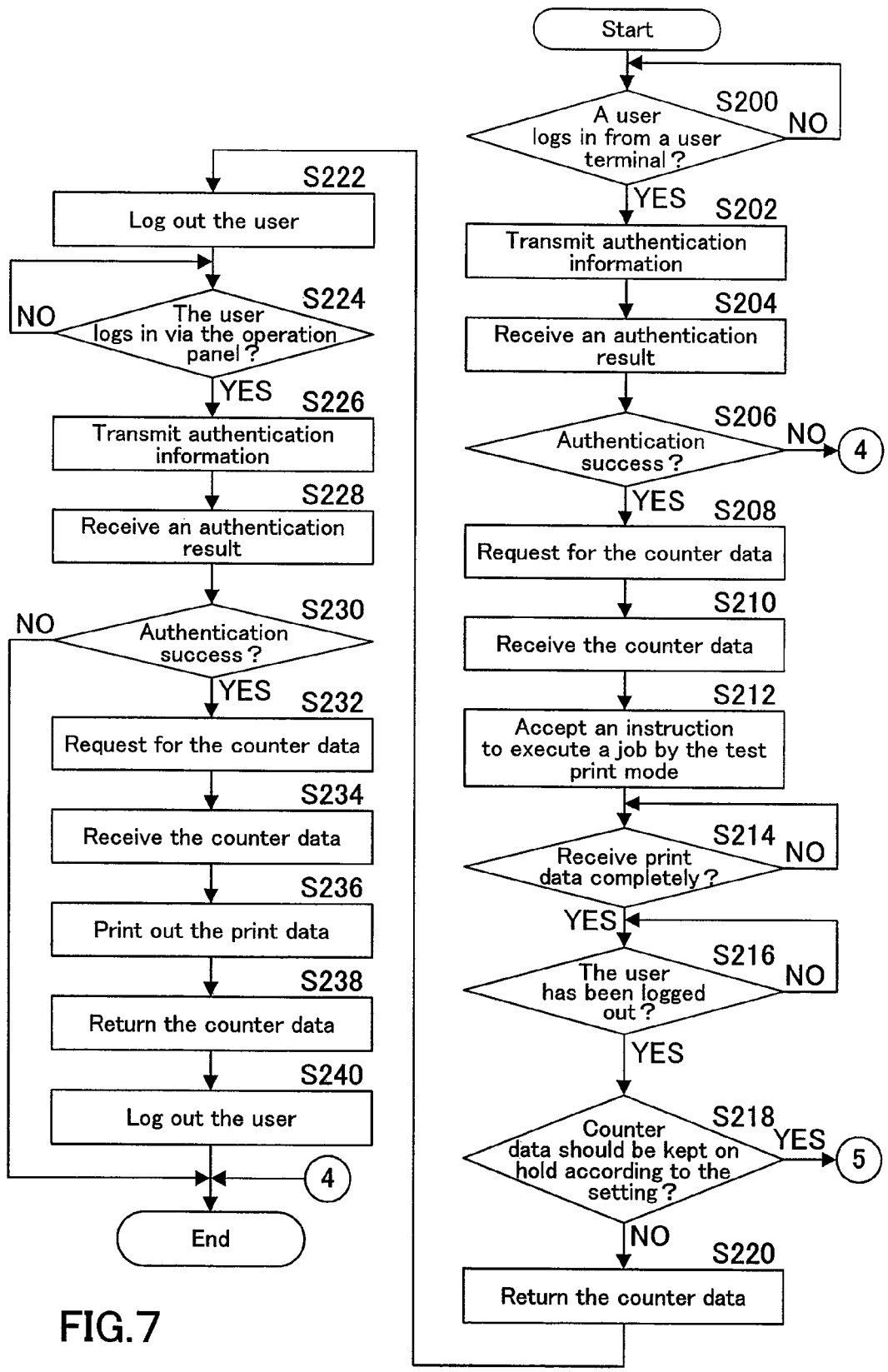
FIG. 7 is a flowchart representing another example of the procedure executed in the job execution system shown in FIG. 1.

FIG. 7 is a flowchart representing another example of the procedure executed in the job execution system shown in FIG. 1.

In this example, if User A logs in the image forming apparatus 1 from his/her using user terminal 5 and performs an operation to transmit print data to the image forming apparatus 1 by the test print mode, obtained counter data of User A is kept on hold instead of being returned.

As for the test print mode, it is a mode to store print data temporarily in the memory 15 or the RAM 13 of the image forming apparatus 1 when a user transmits the print data to the image forming apparatus 1 from his/her using user terminal 5, and then make the printer 16 to output on sheets, the temporarily stored print data when this user logs in the image forming apparatus 1 via the operation panel 17 thereof. The procedure represented by the flowchart of FIG. 7 is executed by the CPU 11 according to an operation program stored in a recording medium such as the ROM 12.

In Step S200, it is judged whether or not a user logs in the image forming apparatus 1. If a user logs in by entering his/her authentication information from the user terminal 5, the image forming apparatus 1 transmits an authentication request including the entered authentication information to the authentication server 3, in Step S202. And the authentication server 3 performs authentication and transmits an authentication request to the image forming apparatus 1. Then in Step S204, the image forming apparatus 1 receives the authentication result, and it is judged in Step S206, whether or not it is an authentication success. If it is an authentication failure (NO in Step S206), the routine terminates.

If it is an authentication success (YES in Step S206), a request for counter data of the user is transmitted to the accounting administration server 4, in Step S208. In response to the request, the accounting administration server 4 transmits the counter data of the user. Here, the counter data may be entirely or partially transmitted to the image forming apparatus 1.

Subsequently, the image forming apparatus 1 receives the counter data of the user in Step S210, and accepts an instruction to execute a job by the test print mode, in Step S212, and then it is judged in Step S214, whether or not print data is completely received from the user terminal 5. If it is not completely received yet (NO in Step S214), the routine waits until it is completely received.

If print data is completely received (YES in Step S214), then it is judged in Step S216, whether or not the user who instructed to execute a job by the test print mode has been logged out. If he/she has not been logged out (NO in Step S216), the routine waits until he/she is logged out. If he/she has been logged out (YES in Step S216). Then in Step S218, it is judged according to the setting, whether or not counter data should be kept on hold when a job to be executed by the test print mode is inputted.

If counter data does not have to be kept on hold according to the setting (NO in Step S218), the counter data of the user is returned to the accounting administration server 4 in Step S220, and the user is logged out of the accounting administration server 4 in Step S222.

On the other hand, in a conventional manner, if a job to be executed by the test print mode is inputted from the user terminal 5, the counter data of the user is returned to the accounting administration server 4 and the user is logged out of the accounting administration server 4, unexceptionally, without making a judgment according to the setting, whether or not counter data should be kept on hold.

After the user is logged out, it is judged in Step S224, whether or not the user who instructed to execute a job by the test print mode, logs in the image forming apparatus 1 via the operation panel 17 thereof. If he/she does not log in (NO in Step S224), the routine waits until he/she logs in. If he/she logs in (YES in Step S224), the image forming apparatus 1 transmits an authentication request to the authentication server 3 in Step S226. In return, the image forming apparatus 1 receives an authentication result in Step S228, and it is judged in Step S230, whether or not it is an authentication success. If it is an authentication failure (NO in Step S230), the routine terminates.

If it is an authentication success (YES in Step S230), a request for counter data of the user is transmitted to the accounting administration server 4 in Step S232, then the requested counter data is received in Step S234. Subsequently, the print data that was transmitted from the user terminal 5 and is still stored in the image forming apparatus 1, is printed out in Step S236.

After printing out the print data, the counter data of the other user is returned to the accounting administration server 4 in Step S238, and the user is logged out of the accounting administration server 4 in Step S240. Then the routine terminates.

Figure 8:
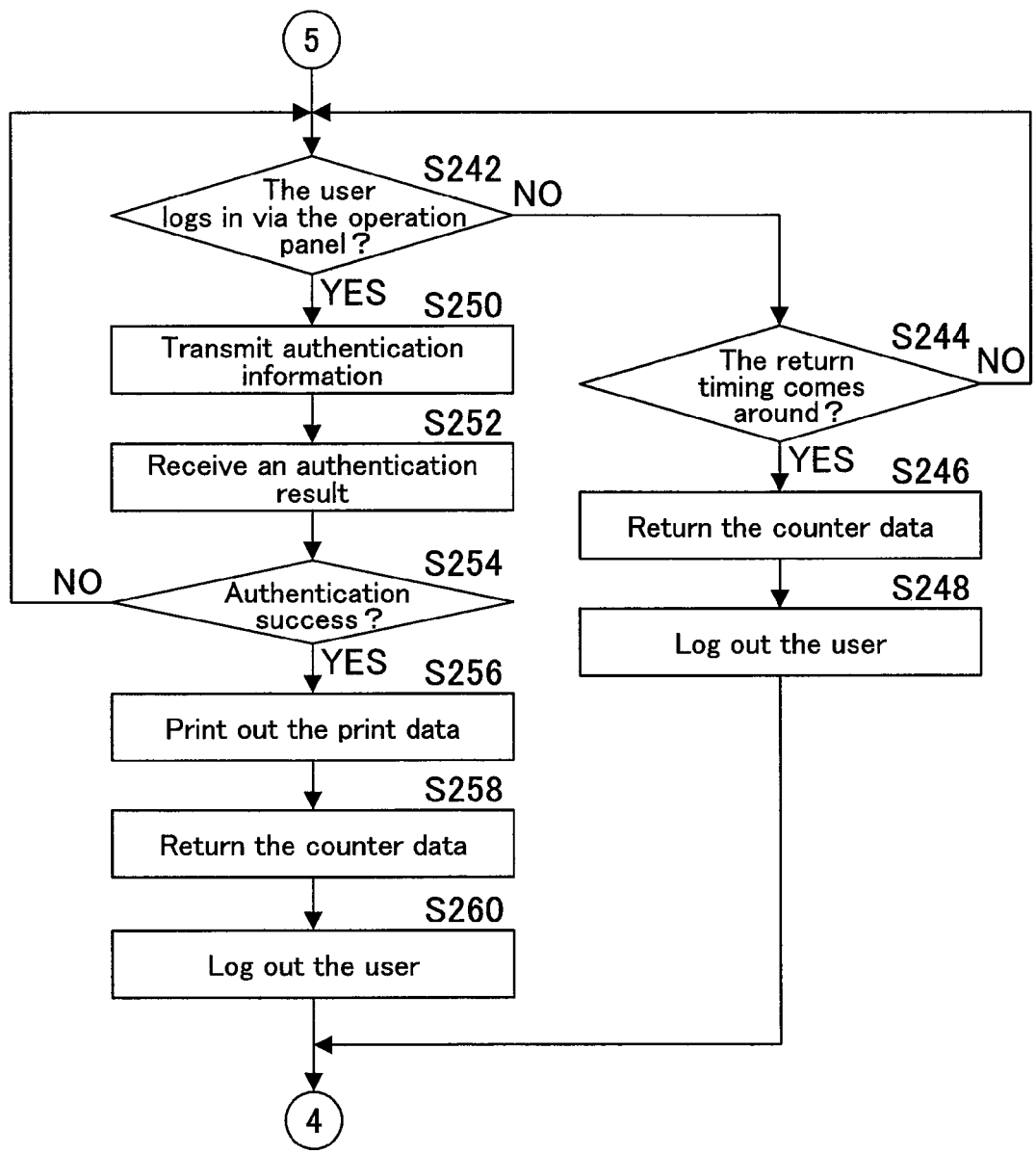
FIG. 8 is a flowchart continued from FIG. 7.

In Step S218, if counter data should be kept on hold when a job to be executed by the test print mode is inputted from the user terminal 5, according to the setting (YES in Step S218), the routine proceeds to Step S242 of FIG. 8, in which it is judged whether or not the user who instructed to execute a job by the test print mode, logs in the image forming apparatus 1 via the operation panel 17 thereof. If he/she does not log in (NO in Step S242), then it is judged in Step S244, whether or not the timing for returning the counter data comes around. In this embodiment, the return timing is set to the time when a predetermined period of time has elapsed from logout of the user who inputted a job to be executed by the test print mode, into the image forming apparatus 1 from the user terminal 5 (the time when timeout occurs).

If the return timing does not come around yet (NO in Step S244), the routine goes back to Step S242 and waits until the user logs in. If the return timing comes around (YES in Step S244), the counter data of the user, which is kept on hold, is returned in Step S246, and the user is logged out of the accounting administration server 4 in Step S248.

Meanwhile in Step S242, if the user logs in (YES in Step S242), authentication information of the user is transmitted to the authentication server 3 in Step S250. Then, an authentication result is received in Step S252, and it is judged in Step S254, whether or not it is an authentication success. If it is an authentication failure (NO in Step S254), the routine goes back to Step S242 and waits until the user logs in again.

If it is an authentication success (YES in Step S254), the print data that was transmitted from the user terminal 5 and is still stored in the image forming apparatus 1, is printed out in Step S256.

After printing out the print data, the counter data of the user is returned to the accounting administration server 4 in Step S258, and the user is logged out of the accounting administration server 4 in Step S260. Then the routine terminates.

As described above in this embodiment, if a user inputted a job to be executed by the test print mode, into the image forming apparatus 1 from the user terminal 5, an operation to return counter data of the user is suspended, since even if the counter data of the user is returned, it would be obtained back anyway as soon as the user logs in again by using the operation panel 17 of the image forming apparatus 1. Thus, it is not necessary any more to return and obtain back and forth the counter data of the user, and the user can obtain sheets printed by the test print mode soon after logging in again.

Furthermore, in this embodiment, if a user who instructed to execute a job by the test print mode does not log in and the return timing comes around i.e. timeout occurs, the counter data of the user is forcibly returned to the accounting administration server 4, which could eliminate the inconvenience that the counter data of the user remains kept in the image forming apparatus 1 for a long time.

Figure 9:
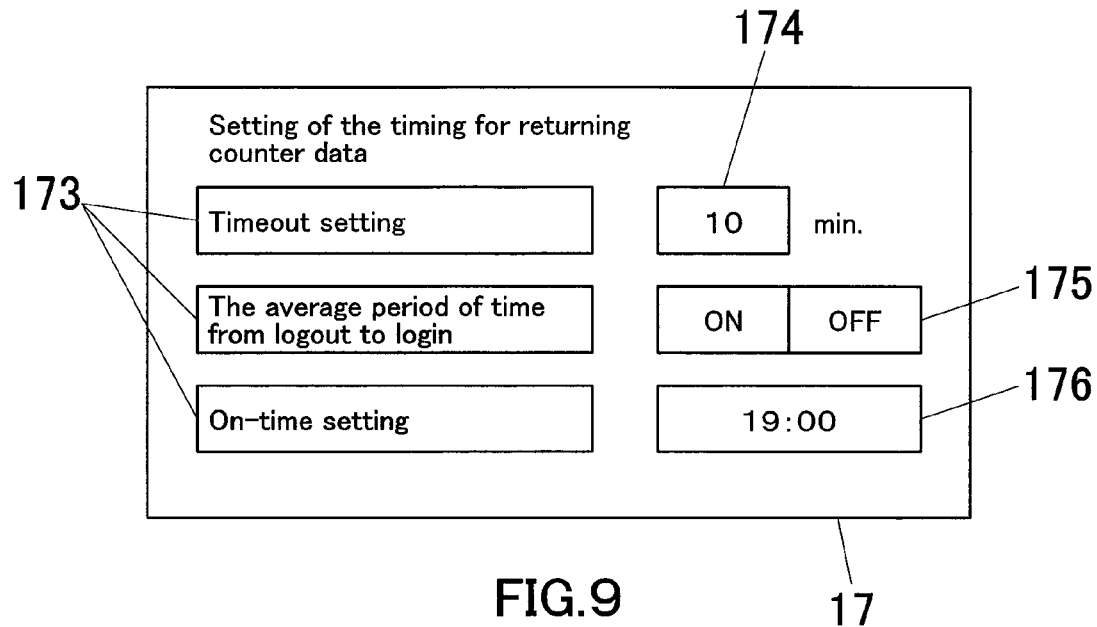
FIG. 9 shows a setting screen to set the timing for returning counter data that is kept on hold, which is displayed on the operation panel.

FIG. 9 shows a setting screen to set the timing for returning counter data that is kept on hold, which is displayed on the operation panel 17. Via this screen, an administrator or etc. can set the timing for returning counter data. Instead of the operation panel 17, the timing may be set from an administrator's terminal or etc. that is a personal computer, by using a setting application.

In the screen shown in FIG. 9, entry fields 173 to enter "the timing for returning counter data", time setting fields 174 and 176, and selection buttons 175 to set "ON" or "OFF", are displayed.

In this example, the return timing is defined by timeout setting, and timeout occurs i.e. the return timing comes around when 10 minutes have been elapsed after logout of a user who inputted a job to be executed by the test print mode from the user terminal 5. Furthermore, a period of time for timeout can be set to the average period of time from logout to login of the past. This setting is enabled or disabled by pressing the "ON" or "OFF" selection button 175. Also, the return timing can be defied by on-time setting, and the setting is enabled by entering a fixed time in the entry field 176.

Figure 10:
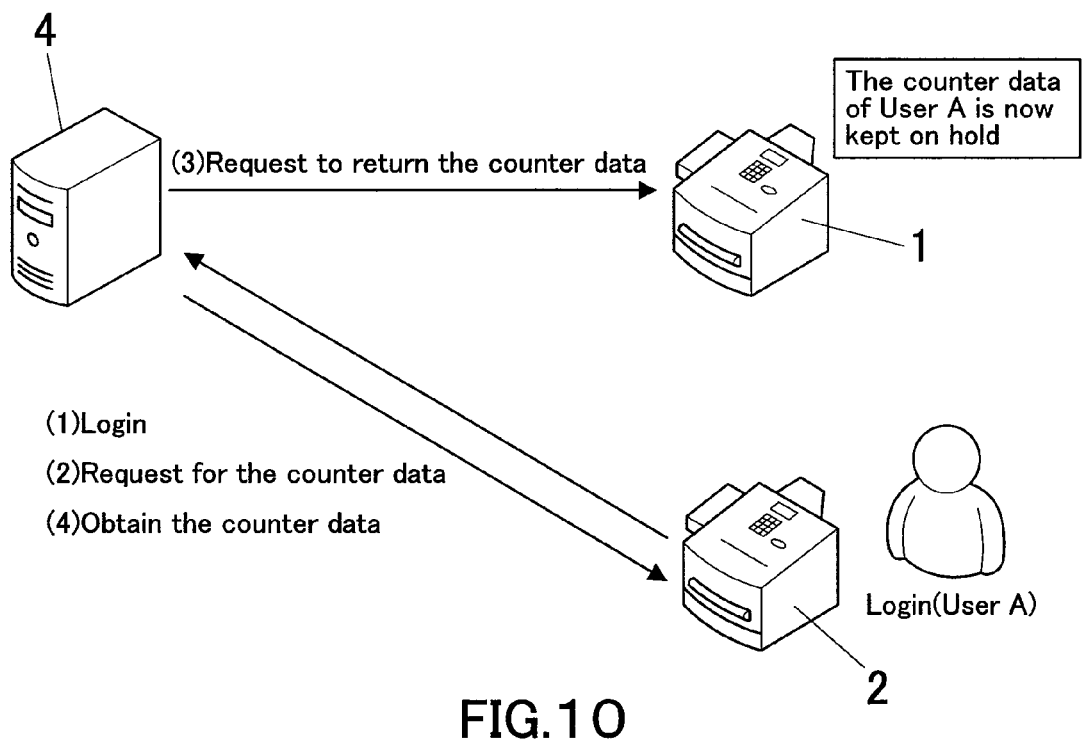
FIG. 10 is a view to explain another embodiment of the present invention.

FIG. 10 shows another embodiment of the present invention.

In this embodiment, if a user (for example, User A) logs in the image forming apparatus 2 (see FIG. 10 (1)) and the image forming apparatus 2 transmits a request for counter data of User A (see FIG. 10 (2)) while the counter data of User A is kept on hold in the image forming apparatus 1, the accounting administration server 4 requests the image forming apparatus 1 to return the counter data (see FIG. 10 (3)), and then allows the image forming apparatus 2 to keep the counter data that is returned from the image forming apparatus 1 (see FIG. 10 (4)).

Figure 11:
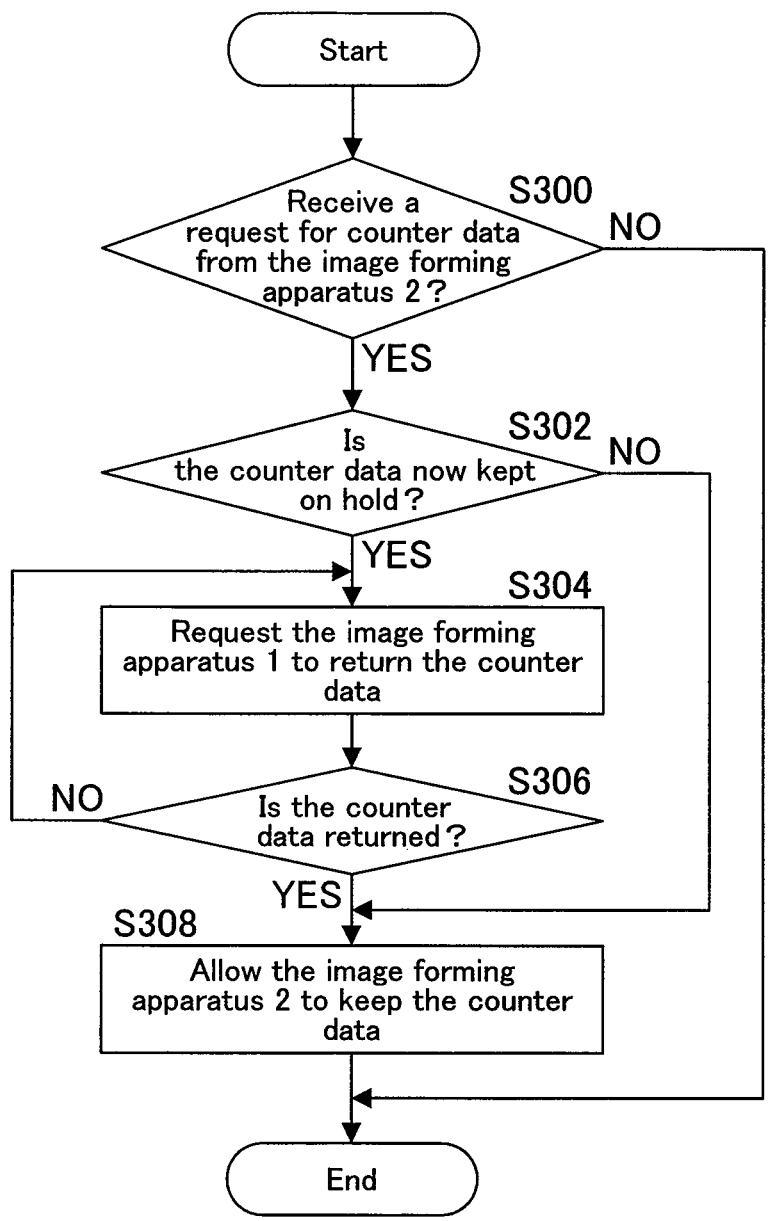
FIG. 11 is a flowchart representing a procedure executed in the accounting administration server 4 in the embodiment shown in FIG. 10.

A procedure executed in the accounting administration server 4 in the embodiment shown in FIG. 10, will be explained with reference to a flowchart shown in FIG. 11. This procedure is executed by the CPU 41 of the accounting administration server 4 according to a program recorded in a recording medium such as the ROM 42.

In Step S300, the accounting administration server 4 judges whether or not a request for counter data of User A is received from the image forming apparatus 2. If such a request is not received (NO in Step S300), the routine terminates. If such a request is received (YES in Step S300), then it is judged in Step S302, whether or not the counter data is now kept on hold in the image forming apparatus 1. If it is now kept on hold (YES in Step S302), the image forming apparatus 1 is requested to return the counter data in Step S304.

Then in Step S306, it is judged whether or not the counter data is returned from the image forming apparatus 1. If it is not returned (NO in Step S306), the routine goes back to Step S304, in which the image forming apparatus 1 is continuously requested to return the counter data. If it is returned (YES in Step S306), the image forming apparatus 2 is allowed to keep the returned counter data of User A in Step S308.

Meanwhile in Step S302, if the counter data of User A is not kept on hold in the image forming apparatus 1 now (NO in Step S302), the routine proceeds to Step S308, in which the image forming apparatus 2 is allowed to keep the counter data of User A.

As described above in this embodiment, if a request for the counter data of User A is received from the image forming apparatus 2 while the counter data of User A is kept on hold in the image forming apparatus 1, the image forming apparatus 1 is requested to return the counter data. Thus, users also can use another image forming apparatus, which could improve user conveniences.

Figure 12:
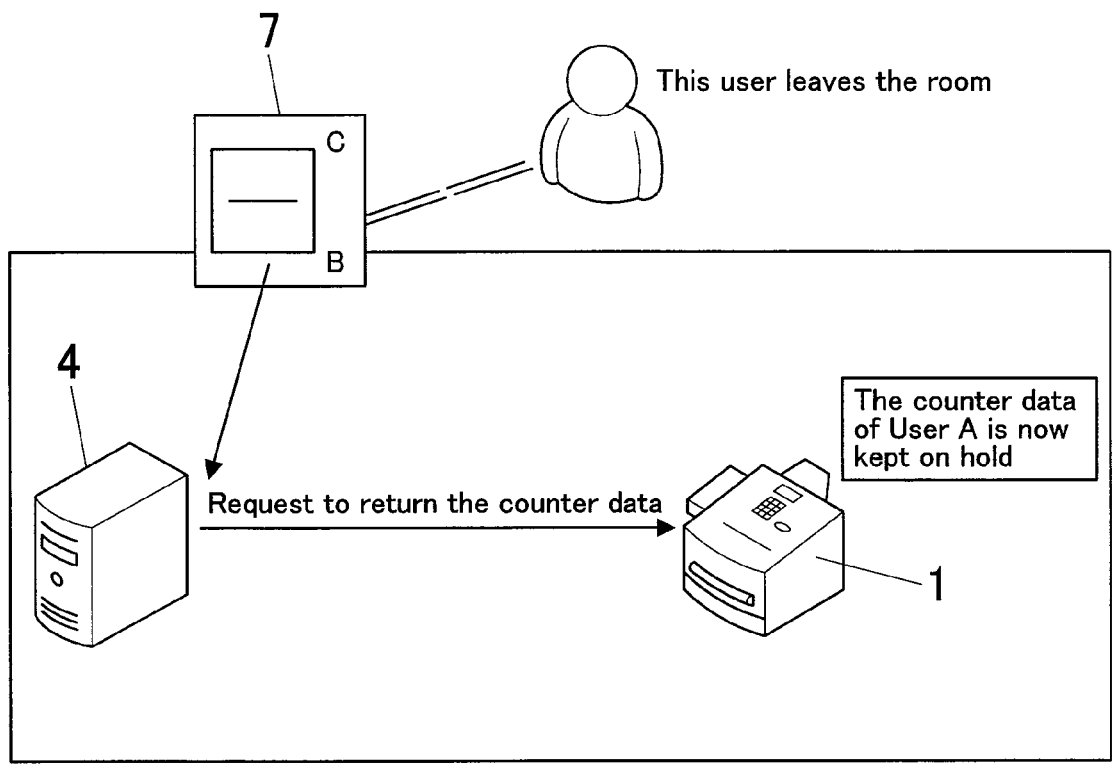
FIG. 12 is a view to explain yet another embodiment of the present invention.

FIG. 12 shows yet another embodiment of the present invention.

In this embodiment, a detection apparatus 7 that detects users entering and leaving a room in which the image forming apparatus 1 is placed, is connected to the accounting administration server 4. If the detection apparatus 7 detects a user (for example, User A) leaving the room while counter data of the user is kept on hold in the image forming apparatus 1 (allowed to keep the counter data by the accounting administration server 4), the accounting administration server 4 requests the image forming apparatus 1 to return the counter data of User A who has left the room, since he/she would not be back to use the image forming apparatus so soon.

Figure 13:
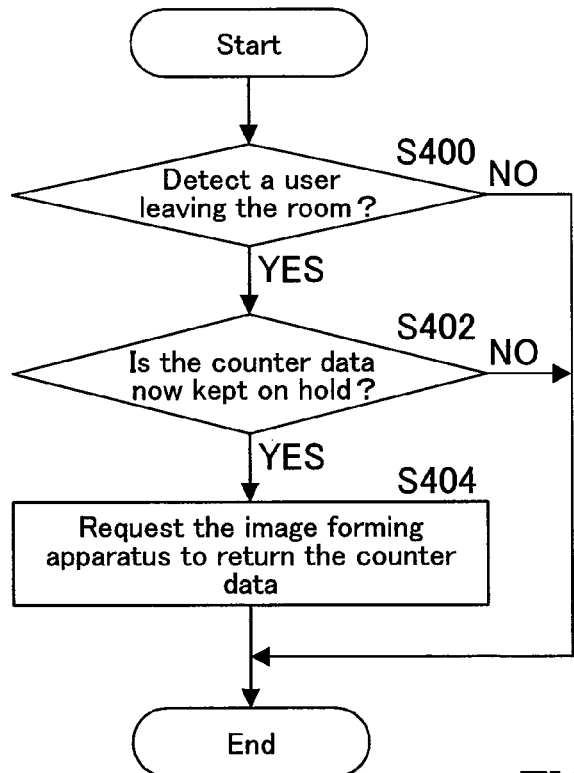
FIG. 13 is a flowchart representing a procedure executed in the accounting administration server 4 in the embodiment shown in FIG. 12.

In this embodiment shown in FIG. 12, a procedure executed in the accounting administration server 4 will be explained with reference to a flowchart shown in FIG. 13. This procedure is executed by the CPU 41 according to a program recorded in a recording medium such as the ROM 42.

In Step S400, the accounting administration server 4 judges whether or not the detection apparatus 7 detects User A leaving the room. If it does not detect this user leaving the room (NO in Step S400), the routine terminates. If it detects this user leaving the room (YES in Step S400), then it is judged in Step S402, whether or not counter data of User A is now kept on hold in the image forming apparatus 1. If it is now kept on hold (YES in Step S402), the image forming apparatus 1 is requested to return the counter data in Step S404.

If it is not kept on hold now (NO in Step S402), the routine terminates.

As described above in this embodiment, if the detection apparatus 7 detects a user leaving the room while counter data of this user is kept on hold in the image forming apparatus 1 (allowed to keep the counter data by the accounting administration server 4), the accounting administration server 4 requests the image forming apparatus 1 to return the counter data, which could eliminate the inconvenience that counter data of a user remains kept in the image forming apparatus 1 for a long time after his/her leaving the room.

Each described above relates to one embodiment of the present invention. However, the present invention is not limited to these embodiments described above.

For example, in these embodiments, an operation to return counter data of a user is suspended, if another user interrupts job execution, or if a job to be executed by the test print mode is inputted from a user terminal. However, conditions for suspending the counter data returning operation are not limited to those mentioned right above. For example, if an administrator happens to log in while a user is in login status; if a user inputs from the user terminal 5, a job other than the job to be executed by the test print mode, and subsequently this user logs in the image forming apparatus 1 to execute the inputted job; or if a user registers from the user terminal 5, destination addresses or other in the image forming apparatus 1, the return operation may be suspended, since this user would be more likely to continue using the image forming apparatus 1.

Furthermore, if a user logs in by section authentication and stores a document in a Box of the memory 15 or in an external apparatus such as a document server, the counter data returning operation may be suspended, since another user who belongs to the same section as his/hers, would be more likely to continue job execution such as printing out the document stored therein.

Furthermore, if test page printing is instructed via a printer driver that is installed on the user terminal 5, the counter data returning operation may be suspended, since real printing would be more likely to be performed soon. Furthermore, if real printing is instructed via the printer driver, the counter data returning operation may be suspended, since copying would be more likely to be performed soon after printing. Furthermore, if overlay forms are registered via the printer driver, the counter data returning operation may be suspended.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A job execution system comprising:
   a server apparatus
      that stores counter data comprising an allowed number of sheets for a first user who logs in the job execution apparatus by authentication, the counter data defining a range of allowed uses for the first user, and
   a job execution apparatus
      that obtains entirely or partially from the server apparatus, counter data of the first user who logs in the job execution apparatus for execution of a first job,
   judges according to one or more conditions set on the job execution apparatus, whether to return the counter data of the first user back to the server apparatus immediately after the execution of the first job is complete, or to suspend return of the counter data of the first user even after the execution of the first job is complete, in order to keep on hold the counter data of the first user for later use, and
   suspends the return of the counter data of the first user, if the job execution apparatus has judged that the return of the counter data of the first user should be suspended.

2. The job execution system recited in claim 1, wherein:
   the job execution apparatus judges that the returning operation should be suspended, if a second user temporarily logs in the job execution apparatus while the first user is still in login status.

3. The job execution system recited in claim 1, wherein:
   the job execution apparatus judges that the returning operation should be suspended, if the first user logs in the job execution apparatus from an external apparatus and inputs a job therefrom.

4. The job execution system recited in claim 1, wherein:
   the job execution apparatus judges that the returning operation should be suspended, if the first user logs in the job execution apparatus by section authentication.

5. The job execution system recited in claim 1, wherein:
   a user can set on the job execution apparatus, whether or not the returning operation should be suspended, about the respective conditions.

6. The job execution system recited in claim 1, wherein:
the job execution apparatus returns the counter data that is kept on hold due to suspension of the returning operation, after a lapse of a predetermined period of time.

7. The job execution system recited in claim 1, wherein:
the job execution apparatus returns the counter data that is kept on hold due to suspension of the returning operation, at a predetermined time.

8. The job execution system recited in claim 1, wherein:
the server apparatus requests the job execution apparatus to return the counter data that is kept on hold therein due to suspension of the returning operation, if the server apparatus receives a request for the counter data from another job execution apparatus while the counter data is still kept on hold in the job execution apparatus due to suspension of the returning operation.

9. The job execution system recited in claim 1, further comprising:
a detector that detects the first user leaving a room in which the job execution apparatus is placed,
and wherein:
the server apparatus requests the job execution apparatus to return the counter data that is kept on hold therein due to suspension of the returning operation, if the detector detects the first user related to the counter data, leaving the room, while the counter data is still kept on hold in the job execution apparatus due to suspension of the returning operation.

10. The job execution system as recited in claim 1, wherein the job execution apparatus suspends the return of the counter data of the first user even if a second user logs in the job execution apparatus for a second job after the execution of the first job is complete, if the job execution apparatus has judged that the return of the counter data of the first user should be suspended.

11. A job execution apparatus comprising:
a receiver that obtains entirely or partially from a server apparatus, counter data comprising an allowed number of sheets for a first user who logs in the job execution apparatus by authentication, the counter data defining a range of allowed uses for the first user for a first job;
a judgment portion executed by a processor of the job execution apparatus that judges according to one or more conditions set on the job execution apparatus itself, whether to return the counter data of the first user back to the server apparatus immediately after completion of the first job, or to suspend return of the counter data of the first user even after the completion of the first job, in order to keep on hold the counter data of the first user for later use; and
a suspending portion executed by a processor of the job execution apparatus that suspends the return of the counter data of the first user, if the job execution apparatus has judged that the return of the counter data of the first user should be suspended.

12. The job execution apparatus recited in claim 11, wherein:
the judgment portion judges that the returning operation should be suspended, if a second user logs in while the first user is still in login status.

13. The job execution apparatus recited in claim 11, wherein:
the judgment portion judges that the returning operation should be suspended, if the first user logs in from an external apparatus and inputs a job therefrom.

14. The job execution apparatus recited in claim 11, wherein:
the judgment portion judges that the returning operation should be suspended, if the first user logs in by section authentication.

15. The job execution apparatus recited in claim 11, wherein:
the first user can set on the job execution apparatus, whether or not the returning operation should be suspended, about the respective conditions.

16. The job execution apparatus recited in claim 11, wherein:
the transmitter returns the counter data that is kept on hold due to suspension of the returning operation, after a lapse of a predetermined period of time.

17. The job execution apparatus recited in claim 11, wherein:
the transmitter returns the counter data that is kept on hold due to suspension of the returning operation, at a predetermined time.

18. The job execution apparatus recited in claim 11, wherein:
the transmitter returns the counter data that is kept on hold due to suspension of the returning operation, if the server apparatus requests to return the counter data.

19. The job execution system as recited in claim 11, wherein the job execution apparatus suspends the return of the counter data of the first user even if a second user logs in the job execution apparatus for a second job after the execution of the first job is complete, if the job execution apparatus has judged that the return of the counter data of the first user should be suspended.

20. A counter data administration method of a job execution apparatus, comprising:
obtaining entirely or partially from a server apparatus, counter data comprising an allowed number of sheets for a first user who logs in the job execution apparatus by authentication, the counter data defining a range of allowed uses for the first user for a first job;
judging according to one or more conditions set on the job execution apparatus, whether to return the counter data of the first user back to the server apparatus immediately after completion of the first job, or to suspend return of the counter data of the first user even after the completion of the first job, in order to keep on hold the counter data of the first user for later use; and
suspending the return of the counter data of the first user if it has been judged that the return of the counter data of the first user should be suspended.

21. The method as recited in claim 20, wherein the return of the counter data of the first user is suspended even if a second user logs in the job execution apparatus for a second job after the execution of the first job is complete, if it has been judged that the return of the counter data of the first user should be suspended.

22. A non-transitory computer readable recording medium having a counter data administration program recorded therein to make a computer of a job execution apparatus execute:
obtaining entirely or partially from a server apparatus, counter data comprising an allowed number of sheets for a first user who logs in the job execution apparatus by authentication, the counter data defining the range of allowed uses for a user for execution of a first job;
judging according to one or more conditions set on the job execution apparatus, whether to return the counter data of the first user back to the server apparatus immediately after completion of the first job, or to suspend return of the counter data of the first user even after the completion of the first job, in order to keep on hold the counter data of the first user for later use; and suspending the return of the counter data of the first user if it has been judged that the return of the counter data of the first user should be suspended.

23. The medium as recited in claim 22, wherein the counter data administration program makes the computer of the job execution apparatus suspend the return of the counter data of the first user even if a second user logs in the job execution apparatus for a second job after the execution of the first job is complete, if it has been judged that the return of the counter data of the first user should be suspended.

* * * * *